United States Patent
Tsuji

(10) Patent No.: US 10,401,553 B2
(45) Date of Patent: Sep. 3, 2019

(54) LIQUID CRYSTAL DISPLAY DEVICE AND TURNING FILM FOR LIQUID CRYSTAL DISPLAY DEVICE

(71) Applicant: KEIWA INC., Tokyo (JP)

(72) Inventor: Takahiro Tsuji, Tokyo (JP)

(73) Assignee: KEIWA INC., Tokyo (JP)

( * ) Notice: Subject to any disclaimer, the term of this patent is extended or adjusted under 35 U.S.C. 154(b) by 0 days.

(21) Appl. No.: 15/921,055

(22) Filed: Mar. 14, 2018

(65) Prior Publication Data

US 2018/0275334 A1    Sep. 27, 2018

(30) Foreign Application Priority Data

Mar. 21, 2017  (JP) .................................. 2017-055145
Mar. 1, 2018   (JP) .................................. 2018-036218

(51) Int. Cl.
*G02F 1/1333* (2006.01)
*F21V 8/00* (2006.01)
*G02F 1/1335* (2006.01)

(52) U.S. Cl.
CPC ......... *G02B 6/0053* (2013.01); *G02B 6/0051* (2013.01); *G02F 1/133305* (2013.01); *G02F 1/133504* (2013.01); *G02F 1/133528* (2013.01); *G02F 2001/133507* (2013.01); *G02F 2001/133531* (2013.01)

(58) Field of Classification Search
None
See application file for complete search history.

(56) References Cited

U.S. PATENT DOCUMENTS

| | | | | |
|---|---|---|---|---|
| 5,587,816 | A * | 12/1996 | Gunjima | F21V 9/14 349/113 |
| RE37,377 | E * | 9/2001 | Gunjima | F21V 9/14 349/113 |
| 9,568,772 | B2 * | 2/2017 | Zhu | G02F 1/13363 |
| 10,222,518 | B2 * | 3/2019 | Nonaka | G02B 5/0242 |
| 2005/0007000 | A1 * | 1/2005 | Chou | H01L 27/156 313/116 |
| 2006/0056031 | A1 * | 3/2006 | Capaldo | G02B 5/0221 359/619 |

(Continued)

FOREIGN PATENT DOCUMENTS

CN     102066991 A     5/2011
JP     2016-177903 A   10/2016

(Continued)

*Primary Examiner* — James A Dudek
(74) *Attorney, Agent, or Firm* — Norris McLaughlin, P.A.

(57) ABSTRACT

A liquid crystal display device includes a liquid crystal panel, a light-guiding plate on a back face of the liquid crystal panel, at least one LED light source along an end face of the light-guiding plate, and a turning film between the liquid crystal panel and the light-guiding plate. The turning film includes a substrate layer and a prism array on a back face of the substrate layer. A retardation value of the substrate layer is no less than 180 nm and no greater than 415 nm. In a planar view: an intersection angle $\alpha$ between a transmission axis of the back face side-polarizing plate and ridge lines in the prism array is no less than 0° and less than 90°; the ridge lines are parallel to the end face; and an intersection angle between a slow axis of the substrate layer and the transmission axis is $(45-\alpha/2)°$.

9 Claims, 2 Drawing Sheets

(56) References Cited

U.S. PATENT DOCUMENTS

| | | | |
|---|---|---|---|
| 2006/0056166 A1* | 3/2006 | Yeo | G02B 6/0041 362/19 |
| 2006/0227259 A1* | 10/2006 | Mi | G02B 6/0053 349/61 |
| 2007/0242199 A1* | 10/2007 | Harada | G02F 1/133528 349/117 |
| 2008/0123028 A1* | 5/2008 | Harada | G02B 6/0056 349/96 |
| 2010/0123854 A1* | 5/2010 | Adachi | F21V 7/04 349/61 |
| 2010/0165257 A1* | 7/2010 | Saitoh | G02F 1/13363 349/75 |
| 2011/0116012 A1 | 5/2011 | Biernath et al. | |
| 2011/0149206 A1* | 6/2011 | Lazarev | G02B 5/3033 349/96 |
| 2011/0273643 A1* | 11/2011 | Arai | G02F 1/133528 349/64 |
| 2013/0242210 A1* | 9/2013 | Endo | G02F 1/1335 349/8 |
| 2013/0335823 A1* | 12/2013 | Epstein | G02B 5/3041 359/489.07 |
| 2015/0029442 A1* | 1/2015 | Koike | G02B 6/0053 349/65 |
| 2015/0116833 A1* | 4/2015 | Boyd | G02B 3/0043 359/599 |
| 2015/0248033 A1* | 9/2015 | Zhu | G02F 1/13363 349/57 |
| 2016/0282523 A1* | 9/2016 | Liu | G02B 5/045 |
| 2016/0327822 A1* | 11/2016 | Huang | G02B 6/0073 |
| 2017/0010407 A1* | 1/2017 | Huang | G02B 6/0068 |
| 2017/0131455 A1* | 5/2017 | Asano | G02B 6/0036 |
| 2017/0321114 A1* | 11/2017 | Kamo | C09D 201/00 |
| 2017/0321115 A1* | 11/2017 | Satake | G02B 5/12 |
| 2017/0321116 A1* | 11/2017 | Satake | G02B 5/12 |
| 2018/0081224 A1* | 3/2018 | Kamo | B32B 7/02 |
| 2018/0246373 A1* | 8/2018 | Nakamura | G02B 5/30 |
| 2018/0252968 A1* | 9/2018 | Nakamura | G02F 1/133606 |
| 2018/0275334 A1* | 9/2018 | Tsuji | G02F 1/133504 |
| 2018/0275463 A1* | 9/2018 | Tsuji | G02F 1/133603 |
| 2019/0091970 A1* | 3/2019 | Ueki | C09J 7/29 |
| 2019/0101815 A1* | 4/2019 | Maeda | G02B 27/0972 |
| 2019/0113664 A1* | 4/2019 | Yoshikawa | G02B 5/22 |

FOREIGN PATENT DOCUMENTS

| | | |
|---|---|---|
| KR | 20100056984 A | 5/2010 |
| KR | 20140140538 A | 12/2014 |
| WO | 2009/020194 A1 | 2/2009 |

* cited by examiner

LIQUID CRYSTAL DISPLAY DEVICE AND TURNING FILM FOR LIQUID CRYSTAL DISPLAY DEVICE

BACKGROUND OF THE INVENTION

Field of Invention

The present invention relates to a liquid crystal display device, and a turning film for a liquid crystal display device.

Background Art

Various types of optical sheets having different optical characteristics have found use in liquid crystal display devices so far, and varying combinations of these sheets have been utilized in backlight units for liquid crystal display devices. As an optical film for luminance enhancement, for example, a polyester film has been proposed which includes: a base film formed from a polyester such as polyethylene terephthalate; and a prism lens layer disposed on the base film (see PCT International Publication No. WO 2009/020194).

Such polyethylene terephthalate films are typically produced by biaxial stretching. Unfortunately, polyethylene terephthalate is a crystalline resin, and thus exhibits greater birefringence. Therefore, polyethylene terephthalate formed into a film by biaxial stretching yields molecular orientation in places, and the formed film has greatly varying birefringence accordingly. Thus, in the case that such a polyethylene terephthalate film serves as an optical sheet in a liquid crystal display device, irregularities in color and luminance caused by polarization may appear on the liquid crystal display device.

PRIOR ART DOCUMENTS

Patent Documents

Patent Document 1: PCT International Publication No. WO 2009/020194

SUMMARY OF THE INVENTION

The present invention was made in view of the foregoing circumstances, and has an object to provide a liquid crystal display device and a turning film for use in a liquid crystal display device that are capable of inhibiting irregularities in color and luminance caused by polarization.

A liquid crystal display device according to an aspect of the present invention made for solving the aforementioned problems includes: a liquid crystal panel; a light-guiding plate that is disposed on a back face side of the liquid crystal panel and is for guiding rays of light incident on an end face of the light-guiding plate toward a front face side; at least one LED light source disposed along the end face of the light-guiding plate; and a turning film disposed between the liquid crystal panel and the light-guiding plate. The turning film includes: a substrate layer formed from a transparent resin; and a prism array disposed on a back face side of the substrate layer. The liquid crystal panel includes a liquid crystal cell; and a back face side-polarizing plate disposed on a back face side of the liquid crystal cell. A retardation value of the substrate layer of the turning film is no less than 180 nm and no greater than 415 nm. In a planar view: an intersection angle $\alpha$ between a transmission axis of the back face side-polarizing plate of the liquid crystal panel and a direction of ridge lines in the prism array of the turning film is no less than 0° and less than 90°; the ridge lines in the prism array of the turning film are parallel to the end face of the light-guiding plate; and an intersection angle between a slow axis of the substrate layer of the turning film and the transmission axis of the back face side-polarizing plate of the liquid crystal panel is $(45-\alpha/2)°$.

The liquid crystal display device includes the turning film including: the substrate layer configured to have a small retardation value; and the prism array. This configuration enables control of the vibration direction of rays of light that exit from the turning film. The liquid crystal display device is configured in such a manner that: the intersection angle $\alpha$ between the transmission axis of the back face side-polarizing plate of the liquid crystal panel and the direction of the ridge lines in the prism array of the turning film is no less than 0° and less than 90° in a planar view; the ridge lines in the prism array of the turning film are parallel to the end face of the light-guiding plate in a planar view; and the intersection angle between the slow axis of the substrate layer of the turning film and the transmission axis of the back face side-polarizing plate of the liquid crystal panel is $(45-\alpha/2)°$ in a planar view. Thus, the vibration direction of rays of light that exit from the turning film coincides with the transmission axis of the back face side-polarizing plate of the liquid crystal panel. This configuration reduces optical losses and inhibits irregularities in color and luminance caused by polarization.

It is preferred that the substrate layer contains a polycarbonate as a principal component. This composition improves the transparency and the heat resistance of the substrate layer.

It is preferred that the turning film further includes, on a front face side of the substrate layer, at least one of a diffusion layer, a micro lens array or a reflective polarizing plate. This configuration of the liquid crystal display device improves characteristics of rays of light that exit from the turning film.

It is preferred that prisms constituting the prism array each have an acute angle on the back face side. Thus, for the liquid crystal display device, the shapes of sloping surfaces of the prisms may be selected according to the characteristics of rays of light that exit from the light-guiding plate.

It is preferred that a reflective index of the prism array is no less than 1.35 and no greater than 1.70, and that a difference between the refractive index of the prism array and a refractive index of the substrate layer is no less than 0.01 and no greater than 0.25. Owing to this feature, the liquid crystal display device is capable of appropriately controlling the characteristics of rays of light incident on the substrate layer.

It is preferred that the prism array is elastic. For the liquid crystal display device, this feature prevents scratches on the light-guiding plate that might be otherwise generated by the prism array coming into contact with the light-guiding plate.

It is preferred that the prism array is a resin molded product formed from an ultraviolet-curable resin. For the liquid crystal display device, the use of the ultraviolet-curable resin in the formation of the prism array on the substrate layer enables relatively easy production of the turning film.

It is preferred that the light-guiding plate includes, on a front face side thereof, a prism array or a lenticular lens array, and that ridge lines on a front face of the light-guiding plate are perpendicular to the ridge lines in the prism array of the turning film in a planar view. This configuration improves a viewing angle and other optical performances of the liquid crystal display device.

A turning film according to another aspect of the present invention made for solving the aforementioned problems is for use in a liquid crystal display device including: a liquid crystal panel; a light-guiding plate that is disposed on a back face side of the liquid crystal panel and is for guiding rays of light incident on an end face of the light-guiding plate toward a front face side; and at least one LED light source disposed along the end face of the light-guiding plate. The turning film is disposed between the liquid crystal panel and the light-guiding plate, and includes: a substrate layer containing a polycarbonate as a principal component; a prism array disposed on a back face side of the substrate layer; and a diffusion layer disposed on a front face side of the substrate layer and is for diffusing transmitted rays of light. A retardation value of the substrate layer is no less than 180 nm and no greater than 415 nm, and a variation in an in-plane retardation value of the substrate layer is no greater than 50 nm. An intersection angle between a slow axis of the substrate layer and a direction of ridge lines in the prism array of the turning film is no less than 45° and less than 90° in a planar view.

The turning film includes: the substrate layer containing a polycarbonate as a principal component and having a small retardation value; and the prism array. This configuration enables control of the vibration direction of rays of light that exit from the turning film. Owing to the turning film included in the liquid crystal display device, the vibration direction of rays of light that exit from the turning film coincides with the transmission axis of the back face side-polarizing plate of the liquid crystal panel, whereby optical losses are reduced and irregularities in color and luminance caused by polarization are inhibited.

It is to be noted that the term "front face side" herein means a display surface side of a liquid crystal display device, and the term "back face side" herein means the opposite side thereof. The term "principal component" herein means a component contained in the highest proportion on a mass basis (e.g., in a proportion of 50% by mass or greater). The expression "prisms each have an acute angle" herein means that an intersection angle formed by two sloping surfaces of each prism is less than 90°. The term "variation" herein means dispersion defined in the "glossary of terms used in measurement" included in JIS-Z8103 (2000), and typically refers to a standard deviation.

As described in the foregoing, the liquid crystal display device and the turning film according to the aspects of the present invention enables inhibition of irregularities in color and luminance caused by polarization.

DESCRIPTION OF THE PREFERRED EMBODIMENTS

Embodiments of the present invention will be described below in detail, with appropriate references to the accompanying drawings.

First Embodiment

Liquid Crystal Display Device

Figure 1:
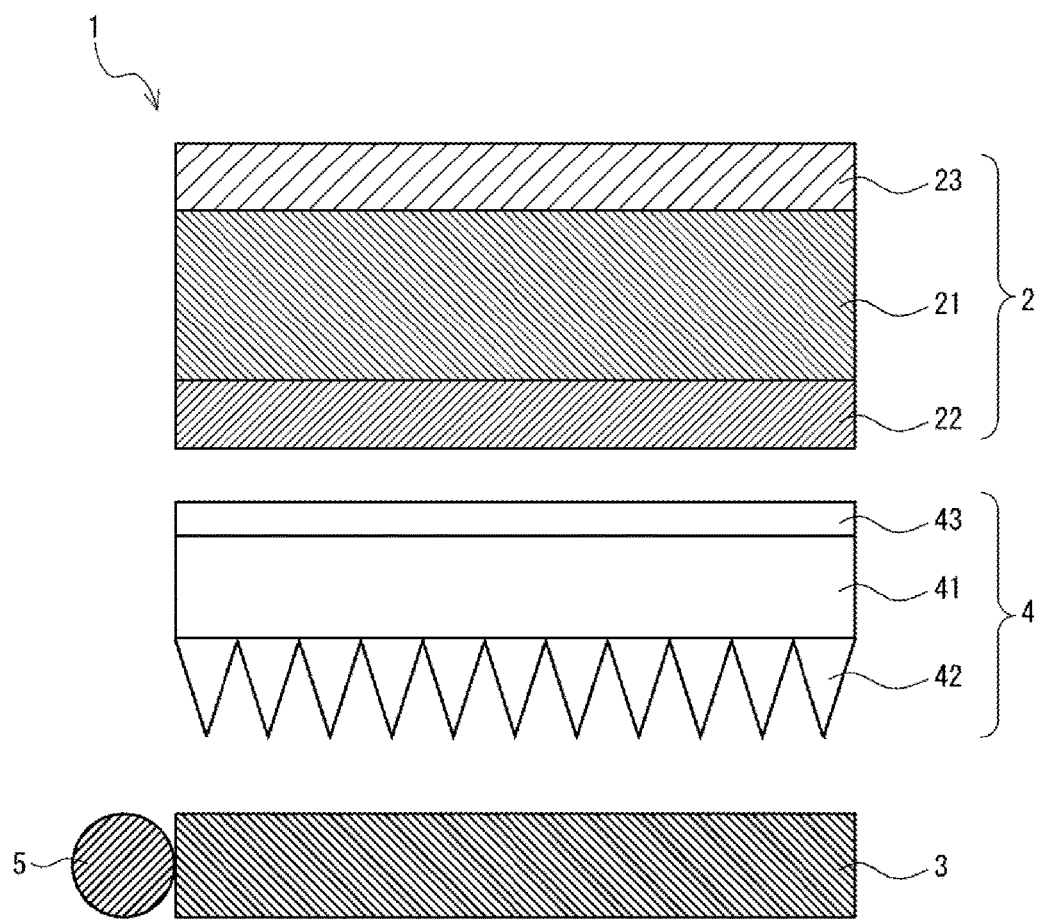
FIG. 1 is a schematic cross-sectional view of a liquid crystal display device according to an embodiment of the present invention.

A liquid crystal display device 1 shown in FIG. 1 includes: a liquid crystal panel 2; a light-guiding plate (a light guide film 3) that is disposed on a back face side of the liquid crystal panel 2 and is for guiding rays of light incident on an end face of the light-guiding plate toward a front face side; at least one LED light source 5 disposed along the end face of the light guide film 3; and a turning film 4 disposed between the liquid crystal panel 2 and the light guide film 3. Due to the need of transmission of rays of light, the light guide film 3 and the turning film 4 are formed to be transparent. The liquid crystal display device 1 further includes a reflection plate (not shown) that is disposed on a back face side of the light guide film 3 such that rays of light incident on the reflection plate from the front face side bounce back to the front face side.

Liquid Crystal Panel

The liquid crystal panel 2 includes: a liquid crystal cell 21; a back face side-polarizing plate 22 disposed on a face (back face) of the liquid crystal cell 21 on the turning film 4 side; and a front face side-polarizing plate 23 disposed on a face (front face) of the liquid crystal cell 21 opposite to the turning film 4 side. Specifically, the liquid crystal panel 2 includes the back face side-polarizing plate 22 and the front face side-polarizing plate 23, which are substantially parallel to each other with a predetermined gap therebetween, and also includes the liquid crystal cell 21 disposed therebetween. The liquid crystal panel 2 has a plate-like shape having a substantially uniform thickness as a whole.

Liquid Crystal Cell

The liquid crystal cell 21 has the function of controlling the amount of light to be transmitted, and may be of well-known types. The liquid crystal cell 21 typically has a laminated structure including one substrate, a color filter, a counter electrode, a liquid crystal layer, a pixel electrode, another substrate, and the like. The pixel electrode is a transparent conductive film formed from, for example, ITO. The display mode of the liquid crystal cell is exemplified by the twisted nematic (TN) mode, the vertical alignment (VA) mode, the in-plane switching (IPS) mode, the ferroelectric liquid crystal (FLC) mode, the anti-ferroelectric liquid crystal (AFLC) mode, the optically compensatory bend (OCB) mode, the supper twisted nematic (STN) mode, the hybrid aligned nematic (HAN) mode, and the like.

Back Face Side-Polarizing Plate and Front Face Side-Polarizing Plate

The back face side-polarizing plate 22 and the front face side-polarizing plate 23 each include, for example, a polarizer such as an iodine-based polarizer, a dye-based polarizer or a polyene-based polarizer, and a pair of transparent protective films disposed on both sides of the polarizer. The transmission axis of the back face side-polarizing plate 22 is orthogonal to the transmission axis of the front face side-polarizing plate 23. In a planar view, the intersection angle between the transmission axis of the back face side-polarizing plate 22 and the direction of the ridge lines in the prism array 42 of the turning film 4 is 45°, and the intersection angle between the transmission axis of the front face side-polarizing plate 23 and the direction of the ridge lines in the prism array 42 of the turning film 4 is 135°. Interchanging is permitted between the direction of the transmission axis of the back face side-polarizing plate 22 and the direction of the transmission axis of the front face side-polarizing plate 23.

Light Guide Film

The light guide film 3 allows rays of light incident on its end face to exit from its front face substantially uniformly. The light guide film 3 is formed into a plate-like shape (non-wedge shape) that is substantially rectangular in a planar view and has a substantially uniform thickness. The light guide film 3 includes, on the back face thereof, recessed portions (not shown) falling toward the front face side, or any other portions. The recessed portions function as a light scattering portion for scattering incident light toward the front face side. Alternatively, protruding portions may function as the light scattering portion. In some embodiments, the light scattering portion may be a protruding or recessed prism array.

The principal component of the light guide film 3 is exemplified by a polycarbonate, an acrylic resin, polyethylene terephthalate, polyethylene naphthalate, a polystyrene, a methyl (meth)acrylate-styrene copolymer, a polyolefin, a cycloolefin polymer, a cycloolefin copolymer, cellulose acetate, a weather resistant vinyl chloride, an active energy ray-curable resin, and the like. Of these, a polycarbonate or an acrylic resin is preferred as the principal component of the light guide film 3. In the case that the light guide sheet 3 contains a polycarbonate, which has superior transparency and a high refractive index, as a principal component, total reflection is likely to occur on the front and back faces of the light guide film 3, whereby rays of light can be efficiently propagated. In addition, owing to the heat resistance of the polycarbonate, the light guide film 3 is less prone to, for example, degradation caused by heat of the at least one LED light source 5. Furthermore, a polycarbonate is less water-absorbent than acrylic resins and the like, and is thus superior in dimension accuracy to the acrylic resins and the like. Therefore, in the case that the light guide film 3 contains the polycarbonate as a principal component, the light guide film 3 has resistance to deterioration over time. Meanwhile, in the case that the light guide film 3 contains an acrylic resin as a principal component, a loss of rays of light in the light guide film 3 can be reduced owing to a higher degree of transparency of the acrylic resin.

Turning Film

The turning film 4 includes: a substrate layer 41 formed from a transparent resin; a prism array 42 disposed on a back face side of the substrate layer 41; and a diffusion layer 43 that is disposed on a front face side of the substrate layer 41 and is for diffusing transmitted rays of light. The turning film 4 is formed to have a substantially rectangular shape in a planar view, and allows rays of light incident on the turning film 4 from the back face side to exit from the front face side.

Substrate Layer

A polycarbonate is used as a principal component of the substrate layer 41 in light of transparency and heat resistance. The substrate layer 41 is formed into a plate-like shape having a substantially uniform thickness. The retardation value of the substrate layer 41 is adjusted to be nearly equal to one-half wavelength of visible light (light with wavelength from 360 nm to 830 nm as defined by JIS-Z8120). In other words, the substrate layer 41 is designed such that the retardation value thereof is no less than 180 nm and no greater than 415 nm, with a variation in an in-plane retardation value being no greater than 50 nm. The slow axis of the substrate layer 41 halves the intersection angle between the transmission axis of the back face side-polarizing plate 22 and the direction perpendicular to the ridge lines in the prism array 42 in a planar view. Specifically, the intersection angle between the slow axis of the substrate layer 41 and the transmission axis of the back face side-polarizing plate 22 of the liquid crystal panel 2 is 45° in a planar view, and the intersection angle between the slow axis of the substrate layer 41 and the direction perpendicular to the ridge lines in the prism array 42 is 22.5° in a planar view. In other words, the slow axis and the retardation value of the substrate layer 41 are adjusted such that the vibration direction of the rays of light entering the turning film 4 and subsequently exiting from the turning film 4 coincides with the transmission axis of the back face side-polarizing plate 22.

Prism Array

The prism array 42 is disposed on the back face side of the substrate layer 41 and includes triangular prisms, each of which has a triangular columnar shape. The ridge lines in the prism array 42 are parallel to the end face of the light guide film 3 on the side on which the at least one LED light source 5 is disposed in a planar view. Thus, the intersection angle between the transmission axis of the back face side-polarizing plate 22 of the liquid crystal panel 2 and the end face of the light guide film 3 on which the at least one LED light source 5 is disposed is 45° in a planar view. The prism array 42 is a resin molded product formed from an ultraviolet-curable resin, and may be formed from, for example, an acrylic ultraviolet-curable resin with high transmissivity. The refractive index of the prism array 42 is no less than 1.35 and no greater than 1.70, and the absolute value of the difference between the refractive index of the prism array 42 and the refractive index of the substrate layer 41 is no less than 0.01 and no greater than 0.25.

Each of the prisms constituting the prism array 42 is formed into a triangular columnar shape that extends from one edge to another edge of a main surface of the turning film 4. Each prism has a ridge line on the top part. The ridge lines of the prisms are substantially parallel to one another. The cross section perpendicular to the ridge line (the cross section shown in FIG. 1) of each prism is an isosceles triangle whose base is shorter than its legs, with the base being in contact with the back face side of the substrate layer 41. Thus, the prisms constituting the prism array 42 each have an acute angle on the back face side. The prism array 42 is preferably elastic so as not to scratch the light guide film 3 opposed to the prism array 42. It is preferred that the oblique sides of each prism are convex arcs or concave arcs, or have any other shapes selected according to the characteristics of rays of light that exit from the light guide film 3.

The configuration of the prism array 42 is not limited to the aforementioned configuration in which the prisms of the prism array 42 are in direct contact with the back face of the substrate layer 41. The prism array 42 may include a transparent prism-substrate layer and prisms disposed on the prism-substrate layer in such a manner that the prisms are disposed on the back face side of the substrate layer 41 with the prism-substrate layer therebetween.

Diffusion Layer

The diffusion layer 43 is disposed on the front face side of the substrate layer 41 to diffuse transmitted rays of light. The diffusion layer 43 is formed on the front face side of the substrate layer 41, and has projections and recesses. With the projections and recesses, the diffusion layer 43 substantially uniformly diffuses rays of light transmitted from the back face side to the front face side, thereby inhibiting glare caused by outgoing rays of light. The projections and recesses of the diffusion layer 43 are formed by, for example, emboss processing, diffusion coating or sandblasting. It is particularly preferred that the diffusion layer 43 is formed by diffusion coating in light of prevention of interference with the pixel pitch of the liquid crystal panel 2.

LED Light Source

The at least one LED light source 5 is disposed along the end face of the light guide film 3. The at least one LED light source 5 is disposed in such a manner that a light emission surface thereof faces (or abuts) the end face of the light guide film 3.

Advantages

The liquid crystal display device 1 includes the turning film 4 including: the substrate layer 41 containing a polycarbonate as a principal component and having a small retardation value; and the prism array 42. This configuration enables control of the vibration direction of rays of light that exit from the turning film 4. The liquid crystal display device 1 is configured in such a manner that: the intersection angle between the transmission axis of the back face side-polarizing plate 22 of the liquid crystal panel 2 and the direction of the ridge lines in the prism array 42 of the turning film 4 is 45° in a planar view; the ridge lines in the prism array 42 of the turning film 4 are parallel to the end face of the light guide film 3 in a planar view; and the intersection angle between the slow axis of the substrate layer 41 of the turning film 4 and the transmission axis of the back face side-polarizing plate 22 of the liquid crystal panel 2 is 22.5° in a planar view. Thus, the vibration direction of rays of light that exit from the turning film 4 coincides with the transmission axis of the back face side-polarizing plate 22 of the liquid crystal panel 2. This configuration reduces optical losses and inhibits irregularities in color and luminance caused by polarization.

The prisms constituting the prism array 42 each have an acute angle on the back face side. Thus, for the liquid crystal display device 1, the shapes of sloping surfaces of the prisms may be selected according to the characteristics of rays of light that exit from the light guide film 3.

The refractive index of the prism array 42 is no less than 1.35 and no greater than 1.70, and the difference between the refractive index of the prism array 42 and the refractive index of the substrate layer 41 is no less than 0.01 and no greater than 0.25. Owing to this feature, the liquid crystal display device 1 is capable of appropriately controlling the characteristics of rays of light incident on the substrate layer 41.

The prism array 42 of the liquid crystal display device 1 is elastic. This feature prevents scratches on the light guide film 3 that might be otherwise generated by the prism array 42 coming into contact with the light guide film 3.

The prism array 42 is a resin molded product formed from an ultraviolet-curable resin. For the liquid crystal display device 1, the use of the ultraviolet-curable resin in the formation of the prism array 42 on the substrate layer 41 enables relative easy production of the turning film 4.

Second Embodiment

Liquid Crystal Display Device

Figure 2:
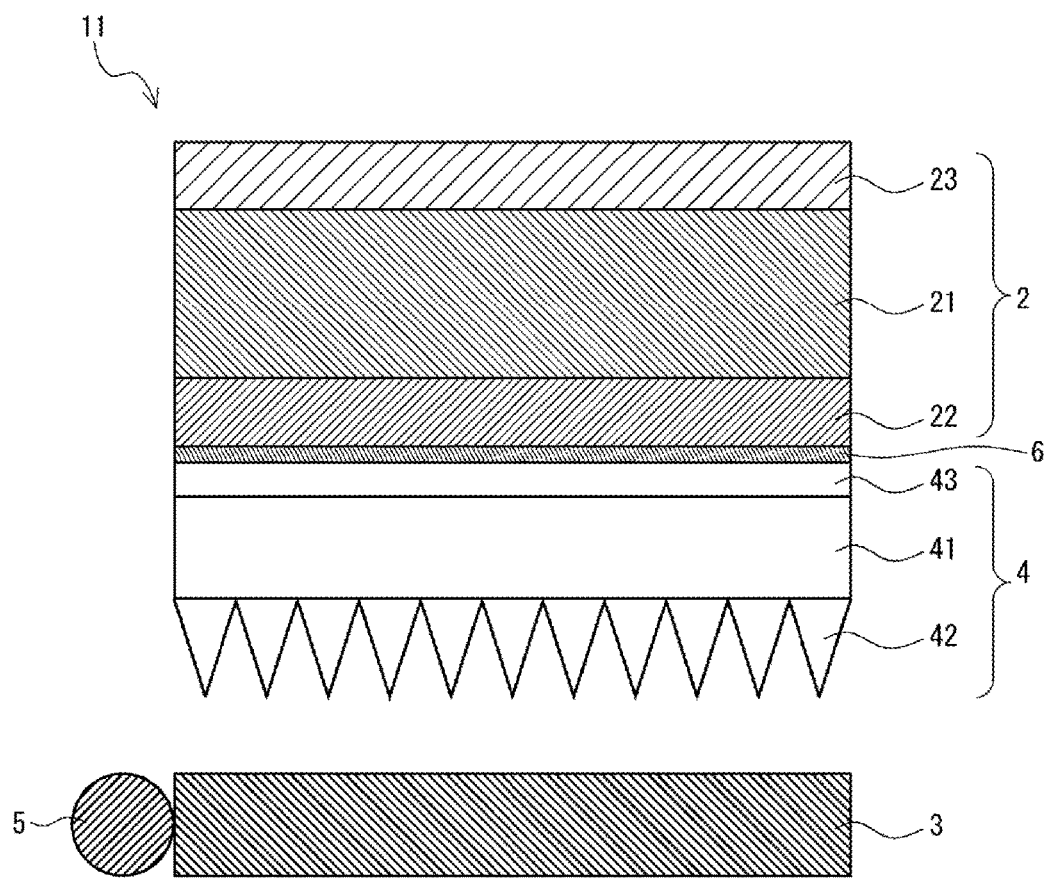
FIG. 2 is a schematic cross-sectional view of a liquid crystal display device according to another embodiment different from the liquid crystal display device shown in FIG. 1.

A liquid crystal display device 11 shown in FIG. 2 includes: the liquid crystal panel 2; the light-guiding plate (the light guide film 3) that is disposed on the back face side of the liquid crystal panel 2 and is for guiding rays of light incident on the end face of the light-guiding plate toward the front face side; the at least one LED light source 5 disposed along the end face of the light guide film 3; and the turning film 4 disposed between the liquid crystal panel 2 and the light guide film 3. The liquid crystal display device 11 further includes a bonding layer 6 disposed between the liquid crystal panel 2 and the turning film 4. The liquid crystal display device 11 may be similar to the liquid crystal display device 1 shown in FIG. 1 except that the bonding layer 6 is included. Thus, the following description will be given solely on the bonding layer 6.

Bonding Layer

The bonding layer 6 bonds the turning film 4 to another member overlaid on a front face side of the turning film 4. Specifically, the bonding layer 6 bonds the turning film 4 to the back face side-polarizing plate 22 disposed on a back face of the liquid crystal cell 21. The bonding layer 6 is an adhesive layer constituted with an adhesive, or an agglutinant layer constituted with an agglutinant.

In the case that the bonding layer 6 is the adhesive layer, the adhesive which may constitute the adhesive layer is exemplified by a thermosetting adhesive, a hot melt adhesive, a photo-curing adhesive and the like. Examples of the thermosetting adhesive include acrylic adhesives, epoxy adhesives, urethane adhesives and the like. Examples of the hot melt adhesive include ethylene-vinyl acetate copolymer (EVA) adhesives, polyester adhesives, polyamide adhesives, thermoplastic polyurethane adhesives, polyolefin adhesives and the like. Examples of the photo-curing adhesive include acrylic ultraviolet-curable adhesives, acrylic urethane ultraviolet-curable adhesives, epoxy ultraviolet-curable adhesives and the like. Of these, acrylic adhesives or acrylic urethane adhesives superior in heat resistance, moisture resistance, etc., are preferred, and acrylic adhesives having a high light transmittance are particularly preferred. The refractive index of the adhesive is preferably adjusted to enable reduction in optical losses caused by the scattering, and/or reflection of rays of light at the interface between the bonding layer 6 and the another member joined to the bonding layer 6. In the case that the frontmost layer of the turning film 4 contains a polycarbonate as a principal component, the refractive index of the adhesive is preferably no less than 1.47 and no greater than 1.55.

In the case that the agglutinant layer is used as the bonding layer 6, the adhesive layer 6 has tack properties. The agglutinant which may constitute the agglutinant layer to be used as the bonding layer 6 is exemplified by pressure sensitive adhesives that are tacky at normal temperature. Examples of the agglutinant which may constitute the agglutinant layer include acrylic agglutinants, urethane agglutinants, silicone agglutinants, epoxy agglutinants and the like.

The liquid crystal display device 11 includes the bonding layer 6 that bonds the turning film 4 to the another member disposed on the front face side of the turning film 4 (the back face side-polarizing plate 22 in this embodiment). This configuration improves handleability of the turning film 4 and the aforementioned another member.

Other Embodiments

It should be understood that the embodiments disclosed herein are all in aspects illustrative and not restrictive. The scope of the invention is defined by the appended claims rather than by the embodiments described herein, and all changes that fall within metes and bounds of the claims, or equivalence of such metes and bounds thereof are therefore intended to be embraced by the claims.

In the embodiment described above, the intersection angle between the transmission axis of the back face side-polarizing plate 22 of the liquid crystal panel 2 and the direction of the ridge lines in the prism array 42 of the turning film 4 is 45° in a planar view, and the intersection angle between the slow axis of the substrate layer 41 of the turning film 4 and the transmission axis of the back face side-polarizing plate 22 of the liquid crystal panel 2 is 22.5° in a planar view, but not limited thereto. It is only required that the intersection angle between the slow axis of the substrate layer 41 of the turning film 4 and the transmission axis of the back face side-polarizing plate 22 of the liquid crystal panel 2 is half the intersection angle between the transmission axis of the back face side-polarizing plate 22 of the liquid crystal panel 2 and the direction perpendicular to the ridge lines in the prism array 42 of the turning film 4 in a planar view. In other words, it is only required that $\beta=(45-\alpha/2)°$, where: α denotes an intersection angle between the transmission axis of the back face side-polarizing plate 22 of the liquid crystal panel 2 and the direction of the ridge lines in the prism array 42 of the turning film 4; and β denotes the intersection angle between the slow axis of the substrate layer 41 of the turning film 4 and the transmission axis of the back face side-polarizing plate 22 of the liquid crystal panel 2. For example, when the intersection angle α is 60°, the intersection angle β is 15°, and when the intersection angle α is 30°, the intersection angle β is 15°.

Accordingly, for the liquid crystal display 1, it is only required that the intersection angle α between the transmission axis of the back face side-polarizing plate 22 of the liquid crystal panel 2 and the direction of the ridge lines in the prism array 42 of the turning film 4 is no less than 0° and less than 90° in a planar view, and that the intersection angle between the slow axis of the substrate layer 41 of the turning film 4 and the transmission axis of the back face side-polarizing plate 22 of the liquid crystal panel 2 is $(45-\alpha/2)°$ in a planar view. For the turning film 4, it is only required that the intersection angle between the slow axis of the substrate layer 41 and the direction of the ridge lines in the prism array 42 is no less than 45° and less than 90° in a planar view.

It is to be noted that the intersection angle α may be 0°. Thus, the liquid crystal display 1 may be configured in such a manner that the transmission axis of the back face side-polarizing plate 22 of the liquid crystal panel 2 is parallel to the ridge lines in the prism array 42 of the turning film 4 in a planar view, and that the intersection angle between the slow axis of the substrate layer 41 of the turning film 4 and the transmission axis of the back face side-polarizing plate 22 of the liquid crystal panel 2 is 45°.

While the light guide film 3 is used as a light-guiding plate in the embodiments described above, the light-guiding plate is not limited to such a film. In some embodiments, the light-guiding plate may have a plate-like shape.

The light-guiding plate may include, on the front face side thereof, either a prism array or a lenticular lens array. In this case, the liquid crystal display device 1 is preferably configured in such a manner that the ridge lines on the front face of the light-guiding plate are perpendicular to ridge lines in the prism array 42 of the turning film 4. The light-guiding plate including, on the front face side thereof, either a prism array or a lenticular lens array improves a viewing angle or other optical performances of the liquid crystal display device 1.

In the embodiments described above, the turning film 4 includes the light diffusion layer 43 disposed on the front face side of the substrate layer 41. In some embodiments, the light diffusion layer 43 may be omitted. The turning film 4 may include, in place of or in addition to the diffusion layer 43, at least a micro lens array or a reflective polarizing plate.

In the case that the turning film includes a reflective polarizing plate on the front face side of the substrate layer, the substrate layer and the reflective polarizing layer may be bonded together by the bonding layer constituted with the adhesive or the agglutinant mentioned above. Alternatively, the turning film may include a bonding layer disposed on the front face side of the substrate layer, and a reflection polarizing plate may be disposed as the another member on a front face side of the bonding layer. In the case that the turning film includes the bonding layer on the front face side of the substrate layer, the turning film may include a release sheet disposed on the front face of the bonding layer.

INDUSTRIAL APPLICABILITY

The liquid crystal display device and the turning film according to the embodiments of the present invention enable inhibition of irregularities in color and luminance caused by polarization.

EXPLANATION OF THE REFERENCE SYMBOLS 1 liquid crystal display device
2 liquid crystal panel
3 light guide film
4 turning film
5 LED light source
6 bonding layer
11 liquid crystal display device
21 liquid crystal cell
22 back face side-polarizing plate
23 front face side-polarizing plate
41 substrate layer
42 prism array
43 diffusion layer

What is claimed is:
1. A liquid crystal display device comprising:
a liquid crystal panel;
a light-guiding plate that is disposed on a back face side of the liquid crystal panel and is for guiding rays of light incident on an end face of the light-guiding plate toward a front face side;
at least one LED light source disposed along the end face of the light-guiding plate; and
a turning film disposed between the liquid crystal panel and the light-guiding plate,
wherein
the turning film comprises:
a substrate layer formed from a transparent resin; and
a prism array disposed on a back face side of the substrate layer, the liquid crystal panel comprises:
a liquid crystal cell; and
a back face side-polarizing plate disposed on a back face side of the liquid crystal cell,
a retardation value of the substrate layer of the turning film is no less than 180 nm and no greater than 415 nm, and
in a planar view,
an intersection angle α between a transmission axis of the back face side-polarizing plate of the liquid crystal panel and a direction of ridge lines in the prism array of the turning film is no less than 0° and less than 90°,
the ridge lines in the prism array of the turning film are parallel to the end face of the light-guiding plate, and
an intersection angle between a slow axis of the substrate layer of the turning film and the transmission axis of the back face side-polarizing plate of the liquid crystal panel is $(45-\alpha/2)°$.

2. The liquid crystal display device according to claim 1, wherein the substrate layer comprises a polycarbonate as a principal component.

3. The liquid crystal display device according to claim 1, wherein the turning film further comprises, on a front face side of the substrate layer, at least one of a diffusion layer, a micro lens array or a reflective polarizing plate.

4. The liquid crystal display device according to claim 1, wherein prisms constituting the prism array each have an acute angle on the back face side.

5. The liquid crystal display device according to claim 1, wherein
a reflective index of the prism array is no less than 1.35 and no greater than 1.70, and
a difference between the refractive index of the prism array and a refractive index of the substrate layer is no less than 0.01 and no greater than 0.25.

6. The liquid crystal display device according to claim 1, wherein the prism array is elastic.

7. The liquid crystal display device according to claim 1, wherein the prism array is a resin molded product formed from an ultraviolet-curable resin.

8. The liquid crystal display device according to claim 1, wherein
the light-guiding plate comprises, on a front face side thereof, a prism array or a lenticular lens array, and
ridge lines on a front face of the light-guiding plate are perpendicular to the ridge lines in the prism array of the turning film in a planar view.

9. A turning film that is for use in a liquid crystal display device comprising: a liquid crystal panel; a light-guiding plate that is disposed on a back face side of the liquid crystal panel and is for guiding rays of light incident on an end face of the light-guiding plate toward a front face side; and at least one LED light source disposed along the end face of the light-guiding plate,
the turning film being disposed between the liquid crystal panel and the light-guiding plate, and comprising:
a substrate layer comprising a polycarbonate as a principal component;
a prism array disposed on a back face side of the substrate layer; and
a diffusion layer that is disposed on a front face side of the substrate layer and is for diffusing transmitted rays of light,
wherein
a retardation value of the substrate layer is no less than 180 nm and no greater than 415 nm, and a variation in an in-plane retardation value of the substrate layer is no greater than 50 nm, and
an intersection angle between a slow axis of the substrate layer and a direction of ridge lines in the prism array of the turning film is no less than 45° and less than 90° in a planar view.

* * * * *